US006947965B2

(12) United States Patent
Glass

(10) Patent No.: US 6,947,965 B2
(45) Date of Patent: Sep. 20, 2005

(54) SYSTEM AND METHOD FOR COMMUNICATIONS IN A DISTRIBUTED COMPUTING ENVIRONMENT

(75) Inventor: Graham W. Glass, Dallas, TX (US)

(73) Assignee: Recursion Software, Inc., Frisco, TX (US)

( * ) Notice: Subject to any disclaimer, the term of this patent is extended or adjusted under 35 U.S.C. 154(b) by 82 days.

(21) Appl. No.: 09/451,497

(22) Filed: Nov. 30, 1999

(65) Prior Publication Data

US 2003/0177170 A1 Sep. 18, 2003

(51) Int. Cl.$^7$ .............................. G06F 15/16; G06F 7/00
(52) U.S. Cl. ........................ 709/203; 709/201; 709/202; 709/203; 719/313; 719/314; 719/315; 719/316; 719/330; 707/103
(58) Field of Search ................................ 709/201–203; 719/313–316, 330

(56) References Cited

U.S. PATENT DOCUMENTS

| | | | | |
|---|---|---|---|---|
| 5,737,607 A | * | 4/1998 | Hamilton et al. | 719/316 |
| 5,881,230 A | * | 3/1999 | Christensen et al. | 395/200.33 |
| 5,903,725 A | * | 5/1999 | Colyer | 709/203 |
| 5,928,335 A | * | 7/1999 | Morita | 709/203 |
| 5,983,233 A | * | 11/1999 | Potonniee | 707/103 R |
| 6,230,160 B1 | * | 5/2001 | Chan et al. | 707/103 |
| 6,385,661 B1 | * | 5/2002 | Gutherie et al. | 709/316 |
| 6,629,128 B1 | * | 9/2003 | Glass | 709/203 |
| 6,714,976 B1 | * | 3/2004 | Wilson et al. | 719/318 |
| 2001/0003824 A1 | * | 6/2001 | Schnier | 709/203 |

OTHER PUBLICATIONS

Cappelo, Robert. "Overview of RMI Architecture (Computer Science Online Course Notes)". University of California Santa Barbara Department of Computer Science. Sep. 7, 1998. http://www.cs.ucsb.edu/~cappello/290i/lectures/rmi/architecture/sld001.htm.*

IIOP: OMG's Internet Inter–ORB Protocol: A Brief Description, printed from http://www.omg.org, published 1994.*

* cited by examiner

*Primary Examiner*—David Wiley
*Assistant Examiner*—Alina Boutah
(74) *Attorney, Agent, or Firm*—Baker Botts L.L.P.

(57) ABSTRACT

A system for communications in a distributed computing environment is provided that includes an application layer (132), a proxy layer (134), a reference layer (136), and an object layer (138). The application layer (132) provides communications between an application (108) and an operating entity. The proxy layer (134) provides communications between the application (108) and a remote proxy (154). The remote proxy (154) is a local representative for a requested object (110) residing in an address space different from an address space in which the application (108) resides. The reference layer (136) provides communications between the remote proxy (154) and the requested object (110). The reference layer (136) includes communication protocol details to support transmission of messages across a network (106) linking the remote proxy (154) and the requested object (110). The object layer (138) includes the requested object (110). The object layer (138) maintains the separation of communication protocol details within the reference layer (136).

18 Claims, 7 Drawing Sheets

SYSTEM AND METHOD FOR COMMUNICATIONS IN A DISTRIBUTED COMPUTING ENVIRONMENT

TECHNICAL FIELD OF THE INVENTION

This invention relates in general to the field of software systems, and more particularly to an improved system and method for communications in a distributed computing environment.

BACKGROUND OF THE INVENTION

Object oriented programming is a method of programming that abstracts a computer program into manageable sections. The basis of object oriented programming is the concept of encapsulation. Encapsulation is a methodology that combines the subroutines, or methods, that manipulate data with the declaration and storage of that data. This encapsulation prevents the data from arbitrarily being accessed by other program subroutines, or objects. When an object is invoked, the associated data is available and can be manipulated by any of the methods that are defined within the object to act upon the data. The basic component of encapsulation is a class. A class is an abstraction for a set of objects that share the same structure and behavior. An object is a single instance of a class that retains the structure and behavior of the class. Objects also contain methods that are the processes that instruct an object to perform some procedure or manipulation of data that the object controls. Classes may also be characterized by their interface which defines the elements necessary for proper communication between objects.

Distributed computing allows an object in a first computer system to seamlessly communicate with and manipulate an object contained in a second computer system when the computers are connected by a computer network. The second computer system may also be referred to as another address space. Sophisticated distributed computing systems have removed the communications burden from the computer programs, or objects in an object oriented programming environment, and placed it in a mid-level operating system that manages communications across a computer network to facilitate a client system's (first computer system) access to and manipulation of data contained on a server system (second computer system). The server system could be a computer in a different address space and remote to a user on the client system.

Distributed computing and object oriented programming have led to the development of distributed object management systems. These distributed object management systems are generally referred to as object request brokers (ORBs). When an object on a client computer system requests access to an object that exists on a server computer system, the distributed object management system provides the communication link between the two computer systems and, thus, between the two objects. The distributed object management system removes the requirement of the client object communicating directly with the server object. Instead, current distributed object management systems utilize a remote proxy object on the client system which models the interface of the server object. The client computer system that requested access to the server object communicates with the remote proxy object that exists on the client computer system. Therefore, the client computer system can operate as if it is communicating directly with a local object. The remote proxy object contains the necessary communications information to allow the client computer system to access and manipulate an object that actually exists on the server computer system. Remote proxies allow the client system to disregard the location of the requested object and the communication details.

A proxy is an object that has an interface and method list identical to another object. However, it does not contain the same detailed computer code. Instead it contains communications requirements that allow the proxy to communicate directly with another object without knowledge of the requesting object. Proxies can be used to control access to certain objects. They may also be used to remove the labor of distributed processing communications from local objects. For example, if object A residing on a first computer system needs to communicate with object B residing on a second computer system, object A must know the location of object B and have the necessary computer code to initiate communications with object B. A proxy for object B located on the first computer system allows object A to simply communicate with the proxy of object B as if object B resided on the same computer. The proxy for Object B has all the necessary information and computer code to communicate with the real object B on the second computer system. This type of proxy is known as a remote proxy since it exists on a computer system remote from the computer system that contains the requested object.

Systems heretofore known have required all possible remote proxies to be built when the software system is initially compiled and loaded onto a computer. This process can be very time consuming and the resultant remote proxies can require large amounts of computer storage. In addition, software system designers must predict every possible remote proxy that may be needed in the future so that it can be built when the software system is loaded. This process does not allow a system to adapt to its usage and environment.

With the rise of distributed computing systems, client/server computing, and internet/intranet interactions, inter-node communications between applications and objects has become a necessity. Early operating systems lacked support for inter-application communications, forcing software developers to write custom code to perform a remote procedure call for each and every application that needed remote communications.

Distributed computing systems often use a client/server architecture. Typically, a client is an application that runs on a personal computer and relies on a server to perform some operations. The server is a computer on a network that manages network resources such as storage devices, printers, or network traffic. Client-side operations are those occurring on the client-side of a client/server system. For example, on the World Wide Web, applets may be downloaded and executed on a client and are client-side operations. Server-side operations occur on the server of a client/server system. For example, management services performed by the server occur on the server machine and are server-side operations. Client/server systems require communications and operations to take place across a network. ORBs facilitate these communications and operations across the network.

Microsoft has developed DCOM (Distributed Component Object Model) to support inter-application communications across networked computer systems. Another technology standard for inter-object communications is CORBA (Common Object Request Broker Architecture) established by the Object Management Group (OMG) which is a consortium sponsored by many companies, including Digital Equipment Corporation, Hewlett Packard, IBM and Sun Microsystems, Inc. CORBA defines how messages from one object to another are to be formatted and how to guarantee delivery. The messaging in CORBA is performed by Object Request Brokers (ORBs). ORBs receive messages, determine the location of the receiving object, route the message to the receiving object, and perform all necessary platform and language translations. In object oriented technology, a message is typically a request sent to an object to change its state or to return a value. The object has encapsulated methods to implement the response to the received message. Another system for inter-object communications is Voyager developed by ObjectSpace, Inc. Through technology such as DCOM, CORBA, and Voyager, objects can communicate with remote objects residing in other computer platforms connected by a network.

The existence of different ORBs from different developers has resulted in several different communication protocols for transmission and reception of messages across a network. For example, CORBA uses a communication protocol called Internet Inter-ORB Protocol (IIOP). DCOM uses a communication protocol called object Remote Procedure Call (ORPC), and Voyager uses a communication protocol called Voyager Remote Messaging Protocol (VRMP). The communication protocol used by a particular ORB may be referred to as its native protocol or native format. Conventional remote proxies generally have the communication protocol hard coded within the proxy.

CORBA compliant ORBs utilize stubs and skeletons to provide inter-object communications across a network. The stub is on the requestor side and sends messages across the network to a skeleton on the remote object side. The stub and skeleton take care of certain communication details for the proxy on the requestor side and the object on the remote object side. CORBA compliant ORBs generally use a utility to generate a stub and skeleton for each class using information provided in an Interface Description Language (IDL) file for each object.

Enterprise Java Beans (EJB) is an object oriented programming specification developed by Sun Microsystems for use with its Java computer programming language. When using EJB, certain mechanisms are interposed as an intermediate layer between a client object and a server object. This is generally accomplished by creating a wrapper class having the same methods as the object being wrapped and adding wrapping code in each method of the wrapper class. An example of the wrapping code would be adding security to the wrapped object such as limiting access to client objects with the proper password or key. Wrapper classes are generally generated at run time and add additional complexity to the distributed processing system in addition to negatively impacting system performance.

In certain situations, existing software needs to be used with distributing computing systems. Many conventional ORBs require an interface for each class for proper communications across a network. A user may not have access to the source code or may be restricted by license as to modifying the source code. Thus, the user may not be able to add interfaces to class files within the existing software. Adding interfaces allows classes to be used remotely in the distributed computing system.

SUMMARY OF THE INVENTION

Accordingly, a need has arisen for a system and method for communications in a distributed computing environment that provides communications between both compatible and non-compatible object request brokers.

According to an embodiment of the present invention, a system for communications in a distributed computing environment is provided that includes an application layer, a proxy layer, a reference layer, and an object layer. The application layer provides communications between an application and an operating entity. The proxy layer provides communications between the application and a remote proxy. The remote proxy is a local representative for a requested object where the requested object resides in an address space different from an address space where the application resides. The reference layer provides communications between the remote proxy and the requested object. The reference layer includes communication protocol details to support transmission of messages across a network linking the remote proxy and the requested object. The object layer includes the requested object and maintains a separation of communication protocol details within the reference layer.

The present invention provides various technical advantages over conventional systems for communication in a distributed computing environment. For example, one technical advantage is providing communications between object request brokers that use different communication protocols. In addition, the present invention isolates the communication protocol details inside a reference layer so that application programs and objects do not require information regarding the location of a requested object or the communication protocol used to access the object. Other technical advantages may be readily apparent to one skilled in the art from the following figures, description and claims.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
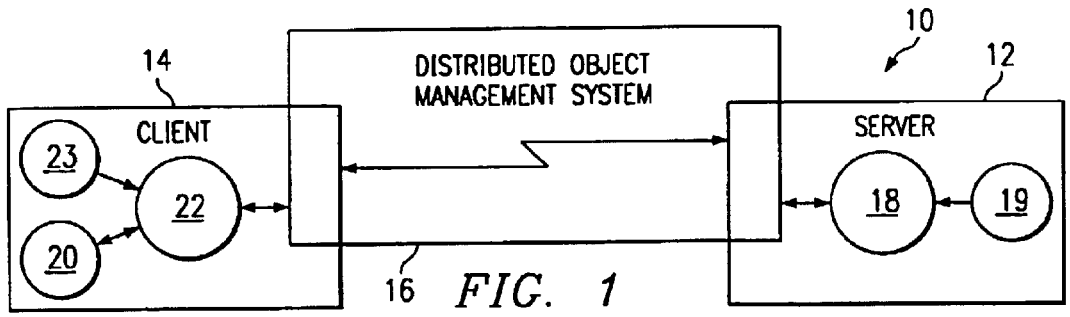
FIG. 1 illustrates a block diagram of a distributed object management system.

Referring to FIG. 1, a distributed processing computer system generally indicated at 10 is illustrated that comprises one or more server systems 12 and one or more client systems 14. The client/server computer systems allow for decentralized computing including the ability to manipulate data which is resident on a remote system. The server system 12 and client system 14 may comprise a personal computer, mini computer, main frame computer, or any other suitable computer type device. In a computer network environment, each computer is assigned a unique address. Therefore, if data, code or objects exist on a different computer, it exists in a different address space.

The client system 14 requests access to data or services that may be contained on server system 12. Server system 12 may then process the request and approve access as requested by client system 14. Client system 14 is connected to server system 12 via a distributed object management system 16 operating across a computer network. The distributed object management system 16 handles the communications between client system 14 and server system 12. Without distributed object management system 16, distributed processing could not take place since client system 14 would not be able to determine the location of or obtain access to the requested data or services. The distributed object management system 16 may comprise Voyager, a distributed network communications system developed by ObjectSpace, Inc., CORBA (Common Object Request Broker Architecture), a technology for inter-object communications developed by a consortium of companies, DCOM, an inter-application communications system for networked computers developed by Microsoft, RMI, an inter-object communications system for networked computers developed by Sun Microsystems, Inc., or any other suitable distributed object management system.

An object is an instance of a class within the programming methodology of object oriented programming. The present invention may be implemented using the Java language, developed by Sun MicroSystems, Inc., or any other suitable computer language.

When an object class source code description is created in the Java language, it is stored on a storage device as a .java file. Upon compilation, the object class executable code is represented as a .class file on the storage device. When an object is needed, a new instance, as prescribed by the .class file is created, and it is then referred to as an object. Server system 12 may contain one or more subject objects 18 for which client system 14 may issue a request for access. In such a case, subject object 18 is the subject of client system's 14 request. Client system 14 may contain one or more local objects 20. Local object 20 can itself be a subject object, and subject object 18 can itself be a local object depending on what computer, or address space, is making the request for access. For purposes of illustrating the present invention, local object 20 and subject object 18 exist in different address spaces. However, both local object 20 and subject object 18 could reside on the same computer and still invoke the system and method of the present invention.

Local object 20 may request access to subject object 18. This request invokes the distributed object management system 16. In order to isolate the distributed processing communication requirements from local object 20, a remote proxy object 22 may be created on server system 12 and loaded onto client system 14. Remote proxy object 22 has an interface and list of methods identical to subject object 18. Remote proxy object 22 is so named since it is remote from subject object 18, and it provides a local representative for an object which may reside in a different address space. Remote proxies in general are responsible for encoding a request and its arguments and sending the encoded request to the subject object that may exist in a different address space. Remote proxies also hide the location of the subject object from the requesting local object. Therefore, any local object can assume, from an access point of view, that any object it needs is local. Local object 20 communicates with remote proxy object 22 which then communicates with subject object 18 via distributed object management system 16. By doing this, local object 20 is unconcerned with the location of subject object 18.

Currently, a system developer must anticipate all necessary remote proxies and create the remote proxy classes. Some distributed object management systems have a utility which augments the build process by allowing remote proxy classes to be built when the system is compiled. Although this process minimizes the system developer's effort, it still involves system developer intervention, computer resources and time. Another disadvantage with current distributed object management systems is that these remote proxy classes must be kept in sync with the subject classes as the subject classes and interfaces are modified. Another disadvantage with current distributed object management systems is that all remote proxy classes must be stored on the computer and available for use when needed. This creates high overhead in developer effort, computer storage and processing requirements.

In contrast, a system constructed using the principles outlined in this patent application dynamically generates remote proxy classes as needed at run-time. There are several advantages of this method. The primary advantage is reduced system development time since the system developer does not have to manually generate remote proxy classes when the system is initially compiled or manually regenerate remote proxy classes each time a subject object class is modified. The system also reduces computer program storage requirements since remote proxy classes are not a permanent part of the operating environment. It also minimizes compile and load time for the computer program since remote proxy classes do not have to be generated at compile and load time. In order to optimize system performance, generated remote proxy classes remain in memory until the distributed object management system is shut down.

Dynamic Generation of Remote Proxies

Referring again to FIG. 1, the dynamic generation of remote proxies may be accomplished by parsing the .class or .java file for subject object 18 and creating a .java file for remote proxy object 22 which contains the interfaces and methods of the subject object 18. The Java compiler may then be invoked to compile the .java file into a .class file for remote proxy object 22. The compiled .class file can then be loaded into the computer system via a class loader which is a standard element in a Java environment. A .class file must be loaded before it is available for use by distributed processing computer system 10. Once the .class file is loaded, a new instance of the compiled .class file may be created which will be remote proxy object 22.

The process of parsing the subject object 18 class (subject class 19) or .java file, creating a source code file for remote proxy class 23, compiling, loading, and creating a new instance may be excessively slow at run-time. In order to address this issue, a reflection process may be used on subject object 18 to determine its name, interfaces and list of methods and then to directly generate the byte codes that define the class of subject object 18. The generated byte codes represent subject class 19. The byte codes are equivalent to the executable code stored in a .class file. The byte codes can then be loaded into the computer system memory with the class loader. This embodiment eliminates the need to parse the .class file, create a .java source code file, and shell out the .java file to a compiler since the byte code generation process occurs as part of the dynamic generation of remote proxies. This entire process of dynamic generation of remote proxies will be discussed in detail with reference to FIGS. 2, 3 and 4.

Figure 2:
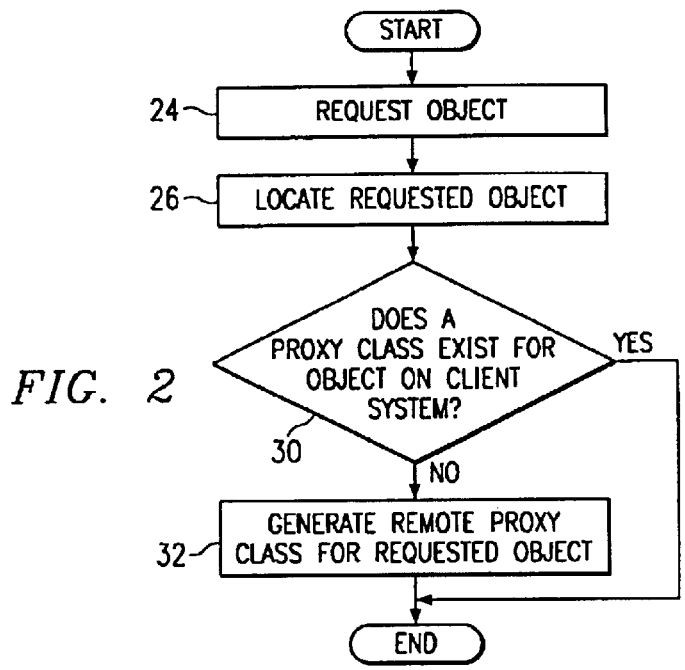
FIG. 2 illustrates a flow diagram of a method for determining when to dynamically generate remote proxy classes.

Referring to FIG. 2, the process of determining whether a remote proxy is necessary is invoked via a request from local object 20 for access to subject object 18. The method begins at step 24 where local object 20 on client system 14 requests access to subject object 18 on server system 12. This request could be for any object whether it is local or remote and in a different address space. The system generates and utilizes remote proxy objects in all inter-object communication to provide additional processing support. Thus, any communication between objects, regardless of their location, utilizes remote proxy objects. These remote proxy objects act as a middle man between the requested object and the requesting object to provide additional processing functionality such as increased security.

Referring again to FIG. 2, the method then proceeds to step 26 where the requested object is located on either client system 14 or server system 12. The method proceeds to step 30 where a determination is made regarding the need for a remote proxy class. If remote proxy class 23 already exists on client system 14, then the method terminates since remote proxy classes are not removed from client system 14 until the distributed object management system 16 is shut down. However, if remote proxy class 23 does not exist on client system 14, the method then proceeds to step 32 where the byte codes representing remote proxy class 23 are generated on server system 12 and loaded into client system 14 memory based on the name, interfaces and methods of subject object 18. A method for generating remote proxies is described in detail with reference to FIGS. 3 and 4.

Figure 3:
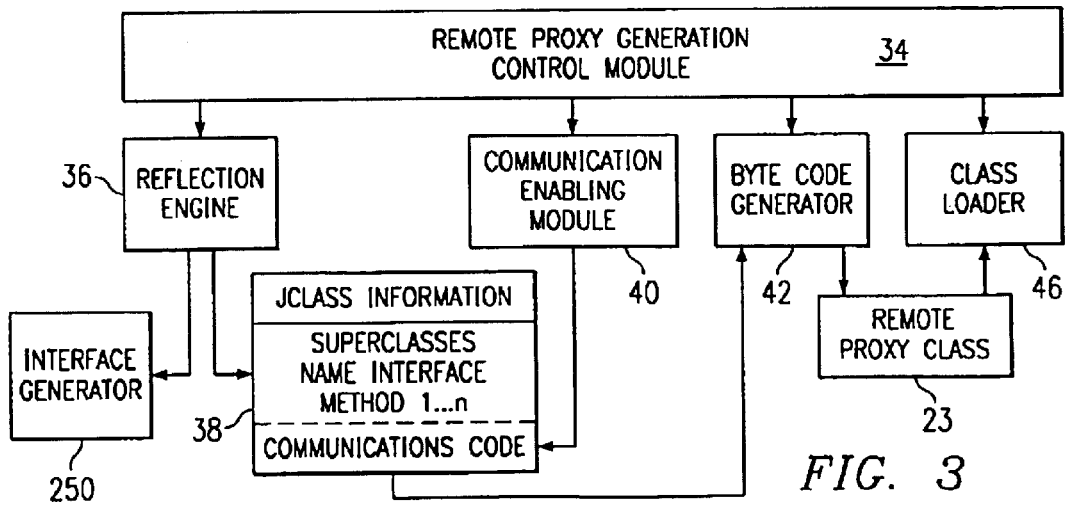
FIG. 3 illustrates a block diagram of a system for dynamically generating remote proxy classes.

FIG. 3 is a functional diagram of the portions of distributed object management system 16 that are used to create remote proxy classes as necessary. Remote proxy generation control module 34 is invoked at step 32 in FIG. 2. When the distributed object management system 16 invokes the remote proxy generation control module 34, the method previously described has already determined that the remote proxy class 23 does not yet exist on client system 14. Remote proxy generation control module 34 generates remote proxy 22 on client system 14 so local object 20 can communicate with subject object 18 via distributed object management system 16.

As previously discussed, in object oriented programming, an object is an instance of a class. Classes may be defined in a class hierarchy where each class inherits the attributes of all of its ancestors. Inheritance is a concept that maps related classes onto each other in a hierarchical way. This allows a descendant of a class to inherit all of its variables and methods from its ancestors as well as create its own. The immediate ancestor of a class is known as the class' superclass. Therefore, in order to determine all of a class's attributes, all of the class's ancestors, or superclasses, should be determined.

To fully define a remote proxy for a subject object, remote proxies should be generated for each of the subject object's superclasses. By generating these superclass remote proxies, the remote proxy for the subject object will inherit all of the variables and methods of its ancestors, or superclasses. An alternative to generating superclass remote proxies includes adding all of the superclass methods and interface requirements to the remote proxy class. By adding the superclass information to the remote proxy class, the need for generating superclass remote proxies is eliminated.

Referring again to FIG. 3, remote proxy generation control module 34 first invokes reflection engine 36 to determine information regarding subject class 19. The process of reflection operates on subject class 19 which is the Java .class file for subject object 18. Although for illustrative purposes, subject object 18 and its Java .class file, subject class 19, exist on server system 12, subject class 19 could exist on either client system 14 or server system 12. Therefore, the dynamic generation of remote proxy classes as described in the present invention could take place on either client system 14 or server system 12.

Reflection is a process that determines what an object can do, how it is defined, and how it communicates with other objects. Reflection mirrors the public view of an object to collect information to facilitate the creation of proxies that resemble objects on the public view, but are very different internally, or privately. The public view of an object represents the information external objects must know in order to communicate with the first object. Proxies need to be reflections, or duplicates on the surface, of objects since proxies perform specific tasks such as controlling access to or communications with the objects they represent. Thus, proxies need to look like the object on the outside, but on the inside, proxies contain unique computer code to accomplish their assigned function. The reflection process is only concerned with determining the public view of an object. Therefore, the information determined by the reflection process includes the following: name; list of implemented interfaces; list of methods; and superclass information.

Continuing with FIG. 3, reflection engine 36 issues queries against subject class 19, which is the .class file for subject object 18, to determine each of subject class 19 superclasses, its name, its interfaces, and each of its methods. The results of these queries are temporarily stored within remote proxy generation control module 34 as JClass information 38. JClass information 38 is a temporary storage area for the name, superclasses, interfaces, and methods of subject class 19. JClass information 38 could also include the name, interfaces, and methods of each of subject class 19 superclasses.

If the queries of reflection engine 36 determine that subject class 19 has no associated interfaces, reflection engine 36 invokes interface generator 250 to generate an interface for subject class 19. The generated interface is associated with subject class 19 and added to JClass information 38. Interface generator 250 will be discussed in detail with reference to FIG. 11.

If subject class 19 has superclasses, a remote proxy may be first generated for each superclass using the system and method described with reference to the present invention. After the superclass remote proxies are generated, JClass information 38 contains the name, interface, and list of methods for subject class 19. An alternate methodology for providing superclass methods and interfaces for the remote proxy class is to add all superclass method and interface information to the remote proxy class. By doing this, the need for separate superclass remote proxies is eliminated.

Once the name, interface, methods, and superclass information are determined for subject class 19, a communication enabling module 40 adds to JClass information 38 the computer code necessary for remote proxy object 22 to communicate with subject object 18 via distributed object management system 16. The communication enabling module 40 inserts the computer code into JClass information 38 which is the definition of all the information that remote proxy object 22 needs to function within distributed object management system 16.

Since a remote proxy's purpose is to communicate with a subject object that may exist either in a different address space or in the same address space, the remote proxy contains essentially the following information: interfaces identical to the subject object; a list of methods identical to the subject object; and computer code necessary for the remote proxy to communicate with the subject object. In an alternate embodiment of the present invention, the remote proxy would contain all of the information mentioned above and the interfaces and methods of all of the subject object's superclasses.

At this point, JClass information 38 contains subject object's 18 name, interfaces, methods, and the computer code necessary for communications within distributed object management system 16. JClass information 38 could also contain the superclass information for subject object 18. The next function invoked by remote proxy generation control module 34 is byte code generator 42. The purpose of a byte code generator 42 is to directly generate the executable code corresponding to JClass information 38. JClass information 38 is the definition of the Java class of which remote proxy object 22 is an instance. That is, JClass information 38 is the definition of remote proxy class 23. Byte code generator 42 reviews JClass information 38 and generates the corresponding byte codes, or executable code, into remote proxy class 23 which is equivalent to a Java .class file except that it is not stored on a permanent storage device.

Byte code generator 42 is a collection of Java classes that are capable of taking the description of the needed proxy class in JClass information 38 and directly generating the executable Java code in memory. The function of byte code generator 42 is similar to that of a Java compiler. Like a Java compiler, byte code generator 42 generates executable Java code. However, the inputs are different. A compiler requires a source code file containing a string of bytes that is the sequence of statements for a Java object definition. The string of bytes is parsed by the Java compiler and translated into executable Java code. In contrast, byte code generator 42 takes general information regarding the needed Java object and directly generates executable Java code without the need for the intermediate step of creating a Java source file. This technique yields considerable time savings since several steps are omitted. For example, like a Java compiler, byte code generator 42 generates a hexadecimal "CAFEBABE" to indicate to the Java virtual machine that a Java .class file begins at that point in memory. Byte code generator 42 is constructed in such a way that the byte codes are generated in the sequence required by the Java virtual machine.

For each Java construct, byte code generator 42 writes the appropriate header information and byte codes representing the Java construct into computer memory. Thus, there is a block of code, or bytes, for each Java construct. As described above, JClass information 38 contains the computer code necessary for communications within distributed object management system 16. Byte code generator 42 translates this communications information into byte codes recognizable to the Java virtual machine. When byte code generator 42 terminates, the string of hexadecimal bytes necessary to define the proxy class has been stored in memory as remote proxy class 23 which is equivalent to an executable Java .class file. The generated remote proxy class 23 is stored in memory and does not go through the system file procedure. Remote proxy class 23 has a unique name which is derived from subject class 19 name. For example, if subject class 19 is named "Foo.class", its remote proxy class 23 name would be "Foo_Proxy.class".

Before remote proxy class 23 can be used, it must be loaded onto client system 14 utilizing a class loader 46. Class loader 46 may comprise any number of suitable programs which exist in typical object oriented programming environments. The class loader 46 takes the generated bytes of remote proxy class 23 stored in memory and loads them into a class structure which then can be instantiated to create remote proxy object 22.

Figure 4:
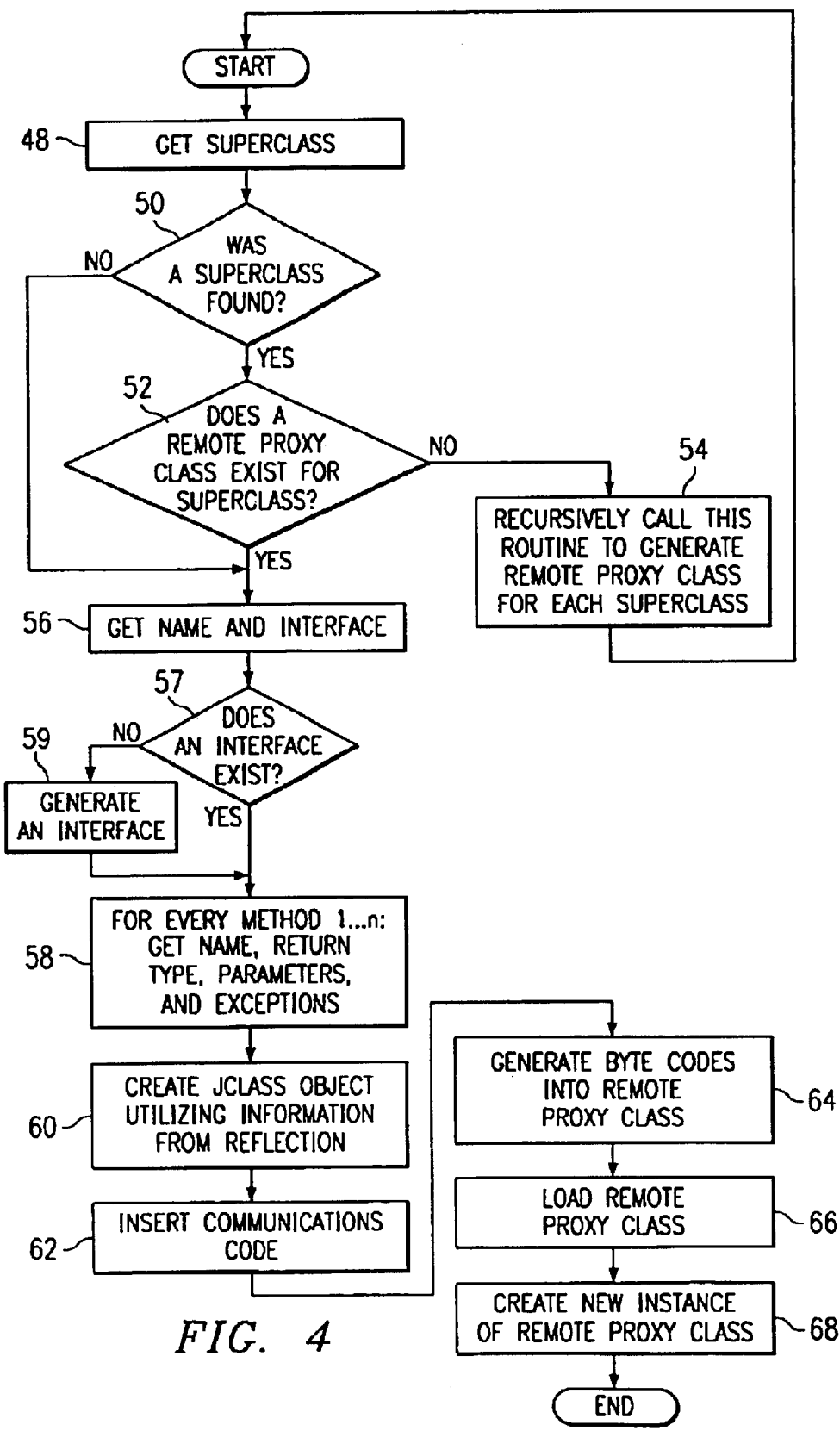
FIG. 4 illustrates a flow diagram of a method for dynamically generating remote proxy classes.

FIG. 4 is a flow diagram that illustrates the process of generating a remote proxy when invoked by step 32 in FIG. 2 and as represented in general by the block diagram in FIG. 3. The method begins at step 48 where the reflection engine 38 queries subject class 19 to determine its superclass. The method then proceeds to step 50 where a determination is made regarding the existence of a superclass for subject class 19. If a superclass is found for subject class 19, then the method proceeds to step 52 where a determination is made regarding the existence of the remote proxy class on client system 14 representing subject class' 19 superclass. If a remote proxy class does not exist for subject class' 19 superclass, the method proceeds to step 54 where the remote proxy class is generated for subject class' 19 superclass by recursively invoking the remote proxy generation control module 34. Thus, step 54 recursively invokes the method illustrated in FIG. 4.

Referring to step 52, if the remote proxy class does exist on client system 14 for subject class' 19 superclass, then the method proceeds to step 56 (described below) since remote proxy classes already exist for all of subject object's 18 superclasses.

In an alternate embodiment of the present invention, instead of recursively generating remote proxy classes for each of subject class 19 superclasses, the interfaces and methods of each of subject class 19 superclasses are stored in JClass information 38 and are later used in the generation of remote proxy class 23. In the alternate embodiment, steps 48–54 would not exist in their current form. Instead, these steps would consist of determining the names, interfaces, and methods of all of subject class 19 superclasses and storing the information in JClass information 38.

Referring to step 50 if a superclass does not exist for subject object 18, then the method proceeds to step 56 where reflection engine 36 queries subject class 19 to determine subject class' 19 name and interface. The method proceeds to decisional step 57 where a decision is made regarding the existence of an interface for subject class 19. If an interface does not exist for subject class 19, the NO branch of decisional step 57 proceeds to step 59 where interface generator 250 generates an interface for subject class 19. The method then proceeds to step 58 (described below).

If an interface does exist for subject class 19, the YES branch of decisional step 57 proceeds to step 58 where reflection engine 36 queries subject class 19 regarding its methods. Reflection engine 36 issues queries for each of subject class' 19 methods until all methods are determined. For each of subject class' 19 methods, the software system determines the method name, return type, parameters, and exceptions and stores the information in JClass information 38.

The method then proceeds to step 60 where reflection engine 36 creates JClass information 38 from the name, interface, and methods information determined in steps 56 and 58. The method then proceeds to step 62 where communication enabling module 40 inserts in JClass information 38 the computer code, in the form of an expression tree, necessary for remote proxy object 22 to communicate with subject object 18 via distributed object management system 16.

The method then proceeds to step 64 where byte code generator 42 generates the executable code representing JClass information 38 into remote proxy class 23. The method then proceeds to step 66 where class loader 46 loads remote proxy class 23 onto client system 14 where it is now available for use. The method then proceeds to step 68 where remote proxy object 22 is generated as a new instance of remote proxy class 23 which was loaded in step 66.

Communication Layers

Figure 5:
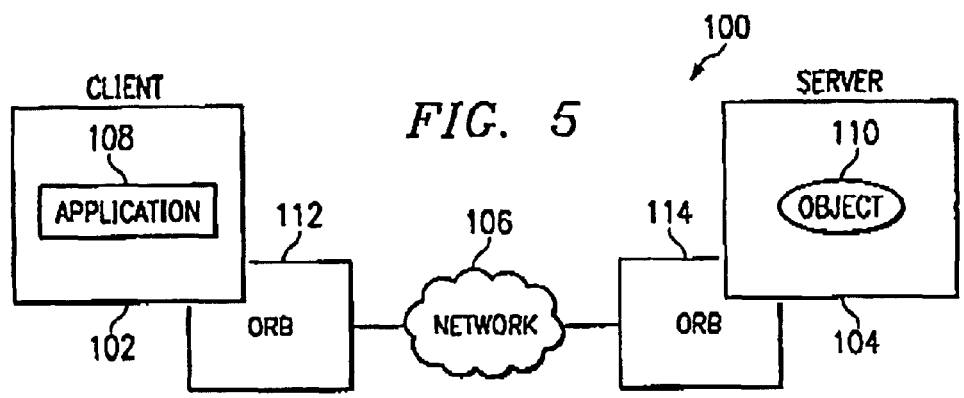
FIG. 5 illustrates a block diagram of a distributed computing system.

Referring to FIG. 5, a distributed computing system is generally indicated at 100. Distributed computing system 100 may comprise a typical client/server system. Distributed computing system 100 includes a client system 102 and a server system 104 linked by a network 106. Distributed computing system 100 may be any suitable distributed processing system including the previously described distributed processing computing system 10. Client system 102 and server system 104 may be any suitable computing device such as a mainframe computer, personal computer, or portable computer. Network 106 may comprise an Internet or other suitable network connecting client system 102 with server system 104. Distributed computing system 100 also includes a client-side object request broker (ORB) 112 and a server-side object request broker (ORB) 114. Client-side ORB 112 executes on client system 102 and provides client-side communication support for distributed computing system 100. Similarly, server-side ORB 114 executes on server system 104 and provides server-side communication support for distributed computing system 100.

Client system 102 includes a client application 108 that accesses a server object 110 on server system 104. Server object 110 may also be referred to as a target object or requested object since server object 110 is the target of a request for access initiated by client application 108. Client application 108 may be an application resident on client system 102, an application uploaded from server system 104, an applet uploaded from server system 104, or any other suitable application or procedure. Client-side ORB 112 and server-side ORB 114 communicate across network 106 to provide a communication link between client application 108 on client system 102 and server object 110 on server system 104. Client-side ORB 112 and server-side ORB 114 are responsible for encoding messages into an on-the-wire format and decoding the message upon receipt. An example of this type of distributed computing system would be the World Wide Web operating across the Internet. "On-the-wire format" as used here refers to the format required for the communication protocol used by the receiving device or the receiving ORB. Client system 102 would typically be a personal computer connected to the Internet. Server system 104 would typically be a web server hosting web pages and other network resources. Client-side ORB 112 may be resident on client system 102, or it may be uploaded from either server system 104 or any other computing device connected to network 106.

Figure 6:
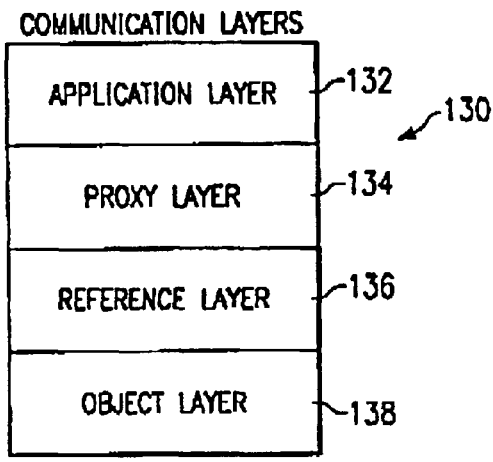
FIG. 6 illustrates different communication layers within the distributed computing system.

Referring to FIG. 6, communication layers of distributed computing system 100 are generally indicated at 130. Communication layers 130 are the layers through which a request, or message, from client application 108 passes as it proceeds to server object 110. The messages sent between client application 108 and server object 110 may include a method invocation. The method invocation is a request from client application 108 to invoke a particular method on server object 110 and may include the server object name, the method name or number to be invoked, and any other arguments or data needed by the invoked method. Communication layers 130 include an application layer 132, a proxy layer 134, a reference layer 136 and an object layer 138.

Application layer 132 includes the primary application or procedure being executed by client system 102 and any interactions with an application controller such as a human operator at a computer terminal. An operating entity such as a human operator at a computer terminal interacts with the primary application or procedure being executed in application layer 132 on client system 102. Application layer 132 communications with the proxy layer 134.

Proxy layer 134 provides a local object on client system 102 for a referenced server object 110 on server system 104. The local reference is a remote proxy that allows application layer 132 to ignore both the location of the server object 110 and the communication details involved in communicating across network 106. The local object in proxy layer 134 is referred to as a remote proxy as previously described. Proxy layer 134 communicates with reference layer 136.

Reference layer 136 allows client-side ORB 112 to communicate with server-side ORB 114 using the communication requirements of server-side ORB 114. The communication requirements, or communication protocol, for server-side ORB 114 may not be identical to the communication requirements, or communication protocol, for client-side ORB 112. Thus, the communication details for distributed computing system 100 are kept in reference layer 136. Communication details include formulating the proper argument list using commands and syntax that may be unique to client-side ORB 112 and encoding the resulting message into an on-the-wire format acceptable to server-side ORB 114. Server-side ORB 114 receives and decodes the message from client-side ORB 112. Reference layer 136 communicates the message to the object layer 138.

Object layer 138 receives the message and forwards it to server object 110. Server object 110 performs the procedure or method requested by the message and forwards the result through communication layers 130 back to client application 108.

Reference Layer Abstraction

Figure 7:
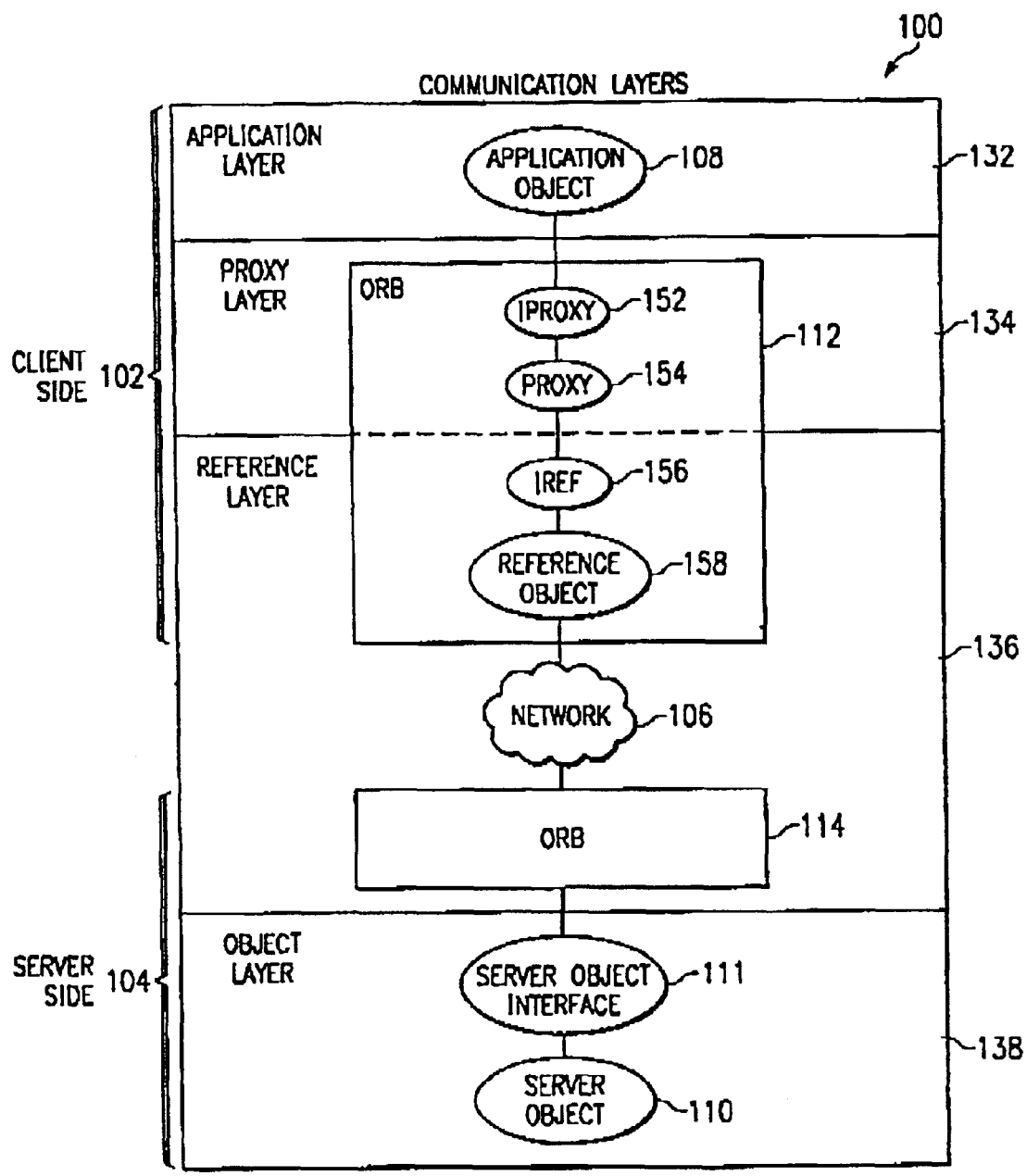
FIG. 7 illustrates a block diagram of the communication layers of the distributed computing system where a client-side object request broker provides a proxy layer and part of a reference layer.

Referring to FIG. 7, the communication layers 130 of distributed computing system 100 are illustrated. Many object-oriented environments utilize an interface as an intermediary for a requested object. The interface defines the public view of the requested object. The public view includes the arguments passed to and from the requested object in addition to the methods available for invocation. Interfaces are used to provide inheritance from multiple sources in the Java programming language. Although the present embodiment uses interfaces, other embodiments may not use interfaces.

When client application 108 requests access to server object 110, a remote proxy 154 is generated for a server object 110 as previously described. Remote proxy 154 has an interface, IProxy 152. In one embodiment, remote proxy 154 is generated from a standard base proxy class. Since Java allows inheritance from only one class, interfaces are used to allow remote proxy 154 to inherit methods and functionality from server object 110. Server object 110 has a server object interface 111. Remote proxy 154 may communicate with server object 110 through server object interface 111. Traditional ORB implementations hardcode information about the communication protocol used to access server object 110 into the remote proxy. This requires different proxy implementations for each communication protocol used in distributed computing system 100. The present invention removes the hardcoded communication protocol information from remote proxy 154 and places it in reference layer 136 where a reference object 158 handles the communication protocol details. Reference object 158 is bound to remote proxy 154 as remote proxy 154 is generated. Since reference object 158 resides in reference layer 136, application layer 132 and proxy layer 134 do not need to know the particular communication protocol used to communicate with server object 110 or the specific location of server object 110. The communication protocol used by a particular ORB may be referred to as the ORB's native protocol or native format. In a particular embodiment, communication enabling module 40, referred to in FIG. 3, generates reference object 158 and places a link in remote proxy 154 to reference object 158.

Reference object 158 has a separate implementation for each communication protocol used in distributed computing system 100. The different communication protocols may be any suitable communication protocol including IIOP, ORPC, and VRMP as previously discussed. An instance of reference object 158 for the communication protocol associated with server object 110 is bound to remote proxy 154 when remote proxy 154 is generated.

In operation, client application 108 requests access to server object 110. The request for access may include invocation of a method of server object 110. This request causes server-side ORB 114 to generate a remote proxy 154 for server object 110 as previously described except that in this embodiment, the computer code necessary for communications is replaced by a link to an instance of reference object 158 for the communication protocol associated with server object 110. Remote proxy 154 is loaded onto client system 102 where it is available for use by client application 108. Communications between client application 108 and server object 110 proceed by client application 108 communicating with remote proxy 154 through its interface IProxy 152.

The method of remote proxy 154 invoked by client application 108 packages the arguments for the requested method and passes them to reference object 158 using its interface, IReference 156. Reference object 158 forwards the arguments to a streamer object (to be discussed in the following section) corresponding to the invoked method for encoding the arguments into a format corresponding to Reference object 158 identifies the communication protocol associated with server object 110. The arguments are passed through network 106 to server-side ORB 114. Server-side ORB 114 receives and decodes the arguments and then passes the arguments to server object 110 where the requested method is processed. Server object 110 passes a result through server-side ORB 114 across network 106 to reference object 158. Reference object 158 decodes the result and passes it to remote proxy 154. Remote proxy 154 then makes the result available to client application 108.

Function Objects and Streaming Architecture

Figure 8:
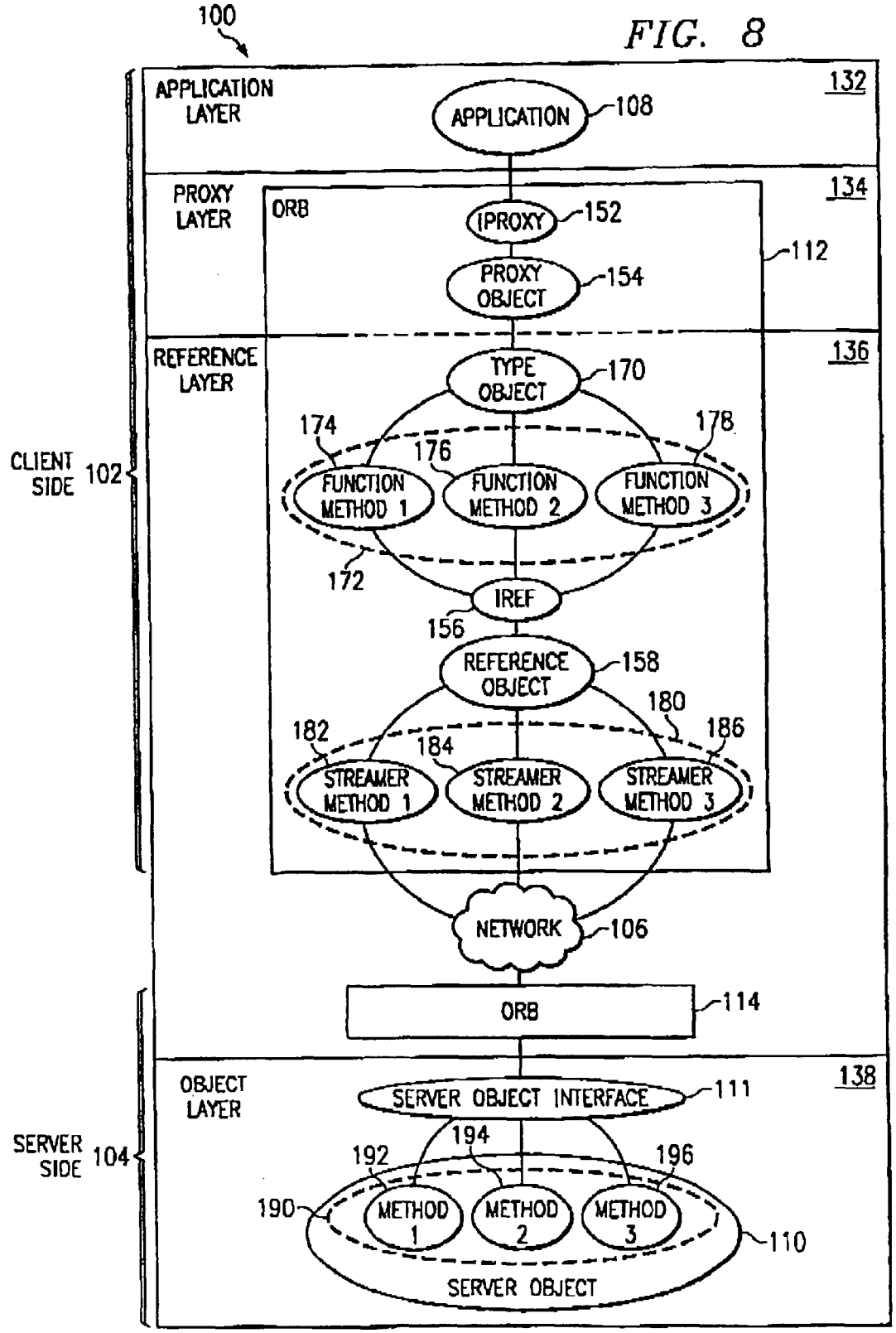
FIG. 8 illustrates additional details of the reference layer provided by the client-side object request broker.

Referring to FIG. 8, additional details of the client-side ORB 112 implementation and communication details are illustrated. In addition to generating reference object 158, communication enabling module 40, discussed with reference to FIG. 3, may also generate a type object 170 linked to proxy object 154 and inserted between proxy object 154 and reference object 158. Type object 170 represents the class of server object 110. Type object 170 defines the methods on server object 110 to which remote proxy 154 has access. Type object 170 includes a set of function objects 172 linked to type object 170. Set of function objects 172 corresponds in number to a set of methods 190 associated with server object 110. There is one function object in set of function objects 172 for each method in set of methods 190. The function objects in set of function objects 172 are sorted in ascending order based on a position of the corresponding method in set of methods 190. By placing methods in function objects, each method can be invoked using a consistent interface. Set of function objects 172 represents the methods in set of methods 190 that client application 108 may invoke.

In operation, when remote proxy 154 receives a method invocation from client application 108, proxy object 154 scans its associated type object 170 and invokes the function object in set of function objects 172 corresponding to the invoked method. Each function object in set of function objects 172 communicates the method invocation to reference object 158 through its interface, IReference 156. In one embodiment, reference object 158 utilizes a set of streamers 180 to format the method invocation into format consistent with the communication protocol used by server object 110. In that embodiment, there is one streamer per method per class. Thus, all instances of a class (all objects with the same class) use the same streamer. Set of streamers 180 handles the encoding and transmission of arguments and results according to the communication protocol used by the receiving object or ORB.

The streamers in set of streamers 180 correspond in number to the function objects in set of functions 172. In one embodiment, communication enabling module 40, discussed with reference to FIG. 3, links a streamer corresponding to each function object in set of function objects 172 to reference object 158. The streamer in set of streamers 180 receives method arguments and a method number from reference object 158 and formats the method invocation for communication across network 106. Passing method or function number instead of method name reduces the amount of data transmitted across network 106 thereby reducing the amount of time used for data transmission. Although some ORBs may receive and process a method number, other ORBs may require a method name. Set of streamers 180 creates and sends serially a group of bytes corresponding to the method invocation initiated by client application 108.

Communication enabling module 40 links streamers in set of streamers 180 to reference object 158. In one embodiment, communication enabling module 40 verifies that an instance of a corresponding streamer exists on client system 102 prior to linking reference object 158 to the streamer. For example, if a method one streamer 182 has already been instantiated for method one of the class associated with server object 110, communication enabling module 40 links reference object 158 to the method one streamer 182. If method one streamer 182 has not been previously instantiated, communication enabling module 40 instantiates a method one streamer 182 and links it to reference object 158. Method 1 streamer 182 may include the non-variable communications specific program code to provide communications between client-side ORB 112 and server-side ORB 114. Each streamer in set of streamers 180 is connected to network 106 so that data may be transmitted to server-side ORB 114. Upon receipt, server-side ORB 114 decodes the communication and forwards the method invocation to the appropriate method in set of methods 190.

Wrapping Mechanism

Figure 9:
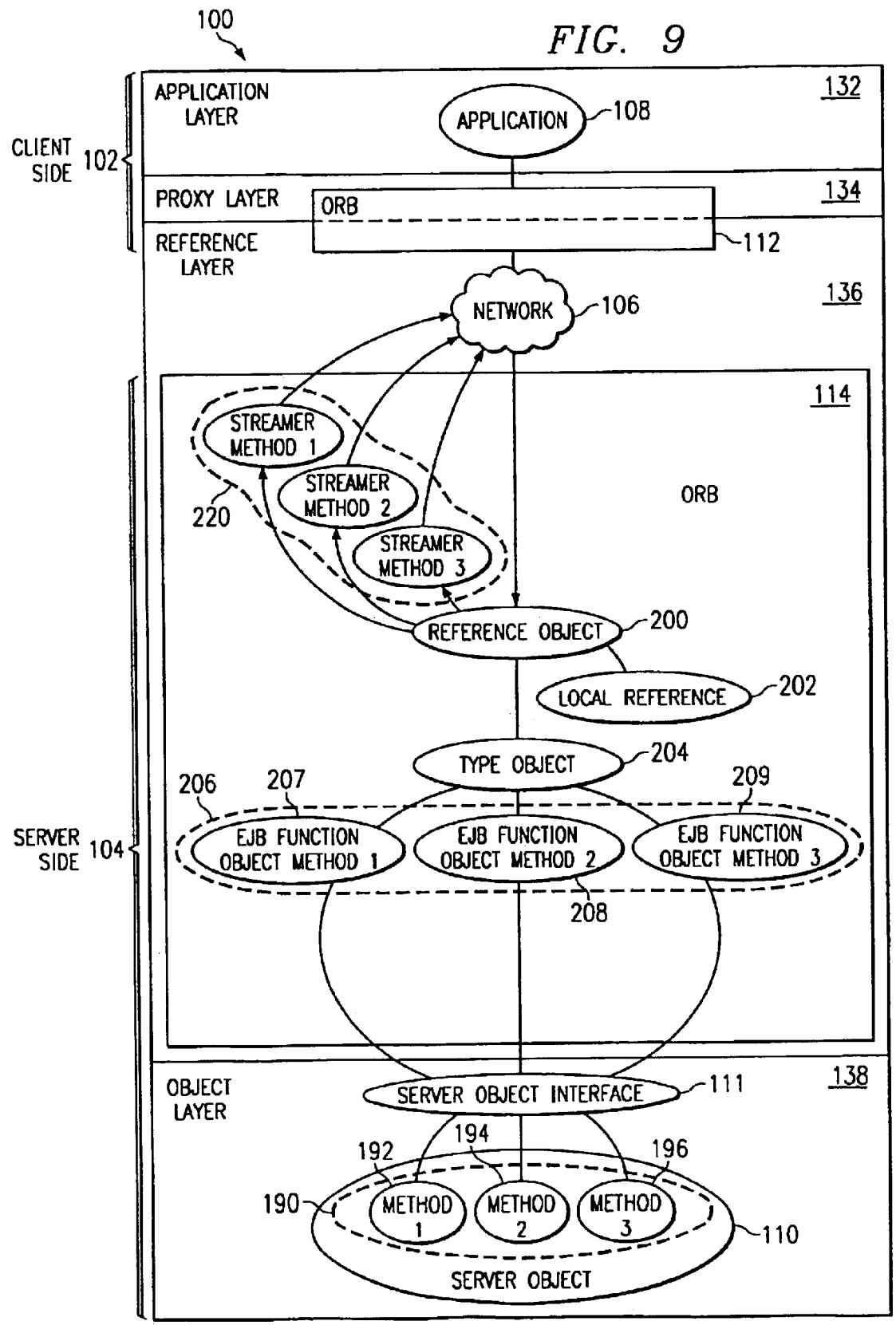
FIG. 9 illustrates a block diagram of additional details of the reference layer provided by a server-side object request broker.

Referring to FIG. 9, details of server-side ORB 114 implementation and communication support for distributed computing system 100 are illustrated. Some object oriented environments use a wrapping approach to interpose an intermediate layer between client objects and server objects. One such approach is Enterprise Java Bean Containers. In the present invention, the generated classes associated with certain wrapping approaches such as Enterprise Java Beans are eliminated and the generated class functionality placed in specialized function objects referred to as EJB function objects. The generated class functionality may include security checking, error handling, transaction management, or any other suitable common functionality.

Server-side ORB 114 includes a reference object 200, a local reference 202, a type object 204, and one or more EJB function objects 206. Upon receipt of a message from client-side ORB 112, server-side ORB 114 obtains a reference object 200 based on communication protocol information included in the message. Reference object 200 is analogous to, and functions as, reference object 158. Thus, server-side ORB 114 locates a reference object 200 for the communication protocol used by server object 110. The message received by server-side ORB 114 is formatted and streamed by a streamer in set of streamers 180 specifically for receipt and processing by server-side ORB 114. Reference object 200 decodes the message from the on-the-wire format and reconstitutes the message for processing by server-side ORB 114. Reference object 200 then forwards the message to local reference 202. Local reference 202 includes address and type information for server object 110. Using that information, local reference 202 locates the appropriate type object 204 for server object 110. Type object 204 represents the class of server object 110 and includes a function object 210 for each method 190 accessible by client application 108.

Type object 204 is generated by server-side ORB 114 at the same time server-side ORB 114 dynamically generates remote proxy 154. An EJB function object 206 is interposed as a specialization of function object 210. EJB function objects 206 are used since creating an instance of a common class, EJB function, is less time-consuming and utilizes fewer system resources than generating a wrapping class for certain wrapping approaches used in object-oriented environments such as Enterprise Java Beans. EJB function objects 206 may also be considered specialized function objects or wrapping objects. Type object 204 forwards the message to the appropriate EJB function object 206 for preliminary processing. Preliminary common processing may include security checking, error handling, transaction management, or any other suitable common functionality. After the preliminary common processing is complete, EJB function object 206 invokes the requested method 190 in server object 110.

After server object 110 processes the method invocation, the result is sent back to client application 108 through essentially the same communication path except that reference object 200 uses an appropriate streamer from set of streamers 220 to encode the result into the appropriate on-the-wire communication protocol format, and the streamers in set of streamers 180 in client-side ORB 112 are bypassed. Client-side ORB 112 locates the appropriate reference object 158 utilizing communication protocol information received with the result message. Set of streamers 220 operates in the same way as set of streamers 180.

CORBA Helperless Communications

A particular implementation of an object request broker is Common Object Request Broker Architecture (CORBA). CORBA classes and structures are derived from Interface Description Language (IDL) definitions, and CORBA-compliant ORBs provide a utility to generate code to represent these classes and structures in a format native to the specific CORBA-compliant ORB implementation. Conventional CORBA ORBs also use the IDL definitions to generate support classes including a client-side stub and server-side skeleton. The client-side stub accepts local requests for access to a server-side target object and encodes the request for transmission across a network to the server-side skeleton. The server-side skeleton decodes incoming requests and forwards the decoded requests to the target object that resides on the server system.

The present invention eliminates the need for stubs and skeletons as used in conventional CORBA-compliant ORBs by using the classes and structures generated from the IDL to provide an ORB-specific implementation of the IDL classes and structures that includes the information needed to communicate with other ORBs. Thus, CORBA stubs and skeletons are not generated. The code generation utility inserts a type code and communication protocol information into each generated class. The type code identifies a structure corresponding to the original IDL definition and provides communications support for communications between CORBA and non-CORBA ORBs.

When a remote invocation is made from a remote proxy 154 in a client-side ORB 112 of the present invention, the reference layer 136 queries the generated class and determines the associated type code and communication protocol information. The type code is used to identify the type object 170 and the communication protocol information is used to determine an appropriate reference object 158 to be used to format the request for transmission to a CORBA-compliant server-side ORB 114. The appropriate reference object 158 formats the request into IIOP format. IIOP is the communication protocol used by CORBA ORBs. The reference object 158 uses a streamer from set of streamers 180 to transmit the request across network 106 to server-side ORB 114.

When a remote invocation is received in a server-side ORB 114 of the present invention from a CORBA-compliant client-side ORB 112, the server-side ORB 114 queries the target object 110 to determine the expected format of the request. Remote invocations are transmitted from the CORBA-compliant client-side ORB 112 in IIOP format. The reference object 158 in the server-side ORB 114 then decodes the request into the expected format and forwards the request to the target object 110.

Server-side ORB Object Generation

Figure 10:
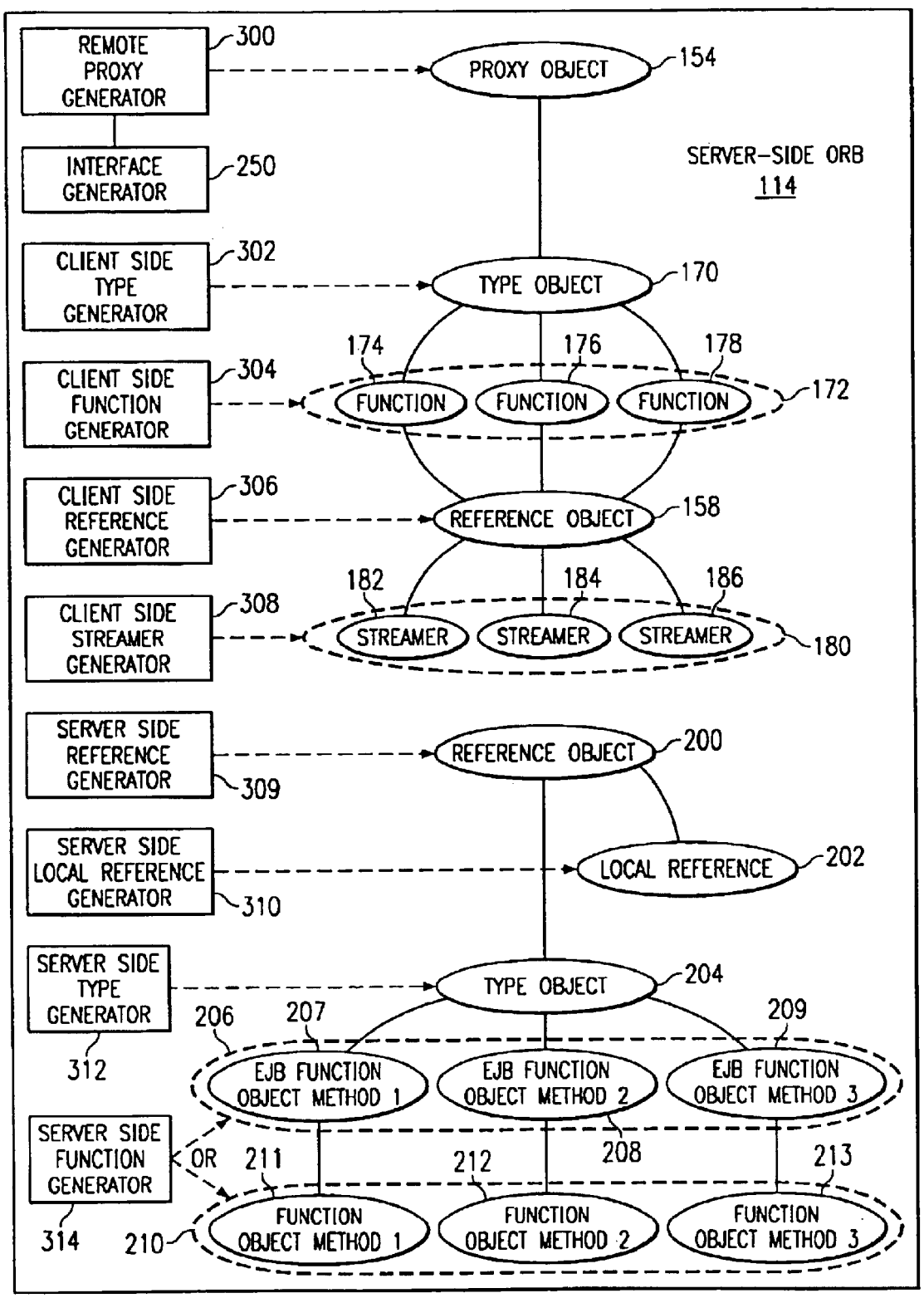
FIG. 10 illustrates a block diagram of a system for dynamically generating remote proxy classes and other objects for the distributed computing system.

Referring to FIG. 10, server-side ORB 114 is illustrated summarizing the various object generation processes of server-side ORB 114 discussed with reference to FIGS. 1–9. Server-side ORB 114 includes a remote proxy generator 300, a client-side type generator 302, a client-side function generator 304, a client-side reference generator 306, a client-side streamer generator 308, a server-side reference generator 309, a server-side local reference generator 310, a server-side type generator 312, and a server-side function generator 314. Upon receiving a request for access to server object 110, server-side ORB 114 generates a set of objects to be uploaded to client-side ORB 112. This set of objects is generated by remote proxy generator 300, client-side type generator 302, client-side function generator 304, client-side reference generator 306, and client-side streamer generator 308. The uploaded set of objects is used by client-side ORB 112 for communications with server-side ORB 114 and access to server object 110. The uploaded set of objects includes proxy object 154, type object 170, set of function objects 172, reference object 158, and set of streamers 180. In another embodiment, the aforementioned uploaded set of objects is generated by the client-side ORB 112 using processes equivalent to those used by server-side ORB 114 in response to transferring a remote proxy instance generated by remote proxy generator 300 to the client-side ORB 112.

Remote proxy generator 300 is similar in structure and operation to remote proxy generation control module 34. In this embodiment, communication enabling module 40 inserts information into the remote proxy class identifying the communication protocol utilized by server-side ORB 114 so that reference object 158 may be located to encode and send a message from client-side ORB 112 to server-side ORB 114. Remote proxy generator 300 generates proxy object 154. Remote proxy generator 300 may also invoke interface generator 250 to remote enable classes without interfaces. Interface generator 250 and remote enabling classes without interfaces are discussed in the following section.

Client-side type generator 302 generates type object 170 using class information obtained from server object 110. Type object 170 represents the class of server object 110 and includes an array of function objects 172 that provide access to the methods of server object 110.

Client-side function generator 304 generates a set of function objects 172 corresponding in number to the methods of server object 110. Each method of server object 110 has a corresponding function object in set of function objects 172. By placing the methods within function objects, a standard object communication statement may be used which does not require knowledge of the location of server object 110 or the communication protocol used to communicate with server object 110.

Client-side reference generator 306 generates reference object 158. Reference object 158 represents the communication protocol used by server-side ORB 114. Client-side reference generator 306 instantiates a standard reference class for the communication protocol utilized by server-side ORB 114.

Client-side streamer generator 308 generates a set of streamers 180. Set of streamers 180 corresponds in number to the methods of server object 110. Each method of server object 110 has an associated streamer object in set of streamers 180. Each streamer object formats and streams an appropriate method invocation request for the associated method of server object 110. Each method on server object 110 may require a different argument list. Thus, separate streamer objects are used to accommodate the different argument lists.

After server-side ORB 114 generates proxy object 154, type object 170, set of function objects 172, reference object 158 and set of streamers 180, server-side ORB 114 uploads the packet of objects to client-side ORB 112 where they are stored for use in communicating with server object 110 through server-side ORB 114. In another embodiment, after server-side ORB 114 generates proxy object 154, proxy object 154 is uploaded to client-side ORB 112 where client-side ORB 112 generates type object 170, set of function objects 172, reference object 158 and set of streamers 180 and stores the generated items for use in communicating with the server object 110 through server-side ORB 114.

Server-side reference generator 309 generates reference object 200. Reference object 200 manages the decoding of messages and method invocations received by server-side ORB 114. Reference object 200 also forwards the messages and method invocations to the corresponding type object 204 associated with a server object referenced in the messages and method invocations.

Server-side local reference generator 310 generates local reference 202 based on the name and type of server object 110. Local reference 202 allows an incoming message destined for server object 110 to communicate with a local reference 202 within server-side object request broker 114 before proceeding to invoking a method on server object 110.

Server-side type generator 312 generates type object 204 representing the class of server object 110. Type object 204 is similar in structure and operation to type object 170.

Server-side function generator 314 generates function objects 210 or specialized function objects such as EJBfunction objects 206. Function objects 210 or EJB function objects 206 correspond in number to the methods of server object 110. Each function object 210 or EJB function object 206 directly invokes a corresponding method on server object 110. Each EJBfunction object 206 is instantiated from a standard EJBfunction class that provides common functionality in addition to the functionality of function object 210. Unique functionality may be added to each EJBfunction object 206 after it has been instantiated to provide for unique processing needs included in function object 210. Server-side function generator 314 generates function objects 210 or EJBfunction objects 206.

Remote Enabling Classes Without Interfaces

Figure 11:
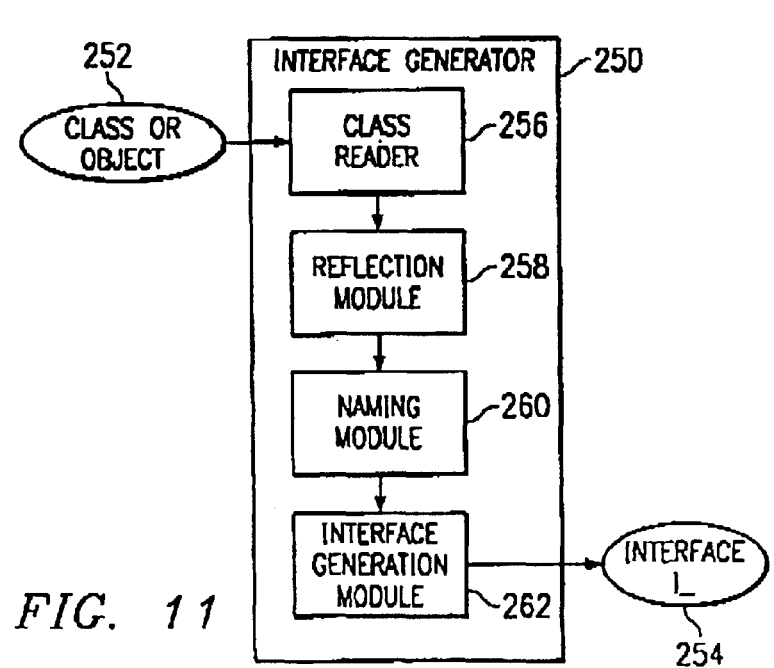
FIG. 11 illustrates a block diagram of an interface generator.

Referring to FIG. 11, an interface generator 250 is illustrated for use in remote enabling classes without interfaces. A typical remote proxy 154 resides in client system 102 and communicates through network 106 with server object 110 using server object interface 111. Existing class files on server system 104 may need to be used remotely by client application 108 on client system 102. Before the existing class file may be used remotely, it should have an interface in order to comply with the communication standards of typical ORBs. Interface generator 250 generates an interface 254 for a class file 252. Interfaces provide for inheritance from multiple sources and ease of method invocation. Without interfaces, a complex procedure using reflection is used to invoke methods directly on objects.

In one embodiment, interface generator 250 is a command line predevelopment utility used to generate interfaces for classes on server system 104 that will be used remotely in distributed computing system 100. In that embodiment, the software developer knows that certain class files 252 will be used remotely. The software developer provides interface generator 250 with a list of class files 252 for which interfaces 254 are to be generated.

Interface generator 250 includes a class reader 256, a reflection module 258, a naming module 260 and an interface generation module 262. Class reader 256 retrieves the first class file name from an input list and reads the associated class 252 from a class repository.

Reflection module 258 uses reflection on class 252 to determine a name of the class, public methods of the class, and a signature for each of the public methods of the class. The reflection process may be any suitable reflection process including Java reflection as previously described. The signature of each public method includes a name of the method, arguments used by the method, a result value for the method, and exceptions of the method.

Naming module 260 creates a name for interface 254 using any suitable naming convention. In one embodiment, the name for interface 254 is created by prepending the letter "I" with the name of class 252. The interface Ixxx is generated for a class named xxx, where xxx is any class name.

Interface generation module 262 generates an interface for class 252 using the name of class 252, the public methods of class 252, and the signature of each public method of class 252. Interface 254 is then added to the class file repository where it is available for use within distributed computing system 100.

In another embodiment, interface generator 250 is used during the previously described dynamic generation of remote proxies. In that embodiment, remote proxy generation control module 34 searches for interfaces implemented by class 252 for which a remote proxy class 23 is being generated. The interfaces may include a standard interface such as java.rmi.Remote or com.objectspace.voyager.IRemote. In addition, the interface may include a default interface with an "I" name as previously described. If none of the interfaces is found, remote proxy generation control module 34 invokes interface generator 250 through reflection engine 36 to generate an interface 254 for a specified class 252. After the interface 254 is generated, it is added to the class file repository where it is available for use with an object having a class of class 252 and when instantiating the remote proxy class 23 to give remote proxy object 22.

Thus, it is apparent that there has been provided in accordance with the present invention a system and method for remote enabling classes without interfaces that satisfies the advantages set forth above. Although the present invention and its advantages have been described in detail, it should be understood that various changes, substitutions, and alterations may be readily apparent to those skilled in the art and may be made herein without departing from the spirit and the scope of the present invention as defined by the following claims.

What is claimed is:

1. A system for communication in a distributed computing environment, comprising:
   a client system having a client application;
   a server system having a server object;
   a network connecting the client system to the server system;
   a client-side object request broker executing on the client system and operable to provide client-side communication support for communications between the client application and the server object, the client-side object request broker divided into a plurality of communication layers including an application layer, a proxy layer, a reference layer, and an object layer, the reference layer operable to remove communication protocol details for accessing the server object from the proxy layer, the reference layer shielding the other layers from communication messaging protocol details used to communicate with the server object;
   a server-side object request broker executing on the server system and operable to provide server-side communication support for communications between the client application and the server object, the server-side object request broker having a different communication messaging protocol than the client-side object request broker.

2. A distributed communications system, comprising:
   an application layer on a client system for executing applications and applets and for interacting with one or more users or operating entities, the application layer providing communications between applications or applets and users or other operating entities;
   a proxy layer on the client system for providing communications between the application or applet and a remote proxy, the remote proxy residing in the client system and representing a server object in a server system;
   a reference layer for providing communication messaging protocol specific links with server objects existing on other computers, the reference layer providing communications between the proxy layer and an object layer, the reference layer operable to remove communication protocol details for accessing server objects from the proxy layer, wherein the application layer and the proxy layer are not aware of communication details in the reference layer, the reference layer including a client-side object request broker executing on the client system and a server-side object request broker executing on the server system, the client-side object request broker having a different communication messaging protocol than the server-side object request broker; and
   an object layer for providing communications between the server object and the reference layer.

3. A method for communications in a distributed computing environment, comprising;
   requesting a method invocation on a server object residing on a second computer from an application in an application layer residing on a first computer, the first computer and the second computer each including an object request broker having different communication messaging protocols;
   generating a remote proxy on the first computer;
   removing communication messaging protocol details for accessing the server object from the remote proxy;
   placing the communication messaging protocol details into the reference object;
   forwarding the method invocation to the remote proxy in a proxy layer, the remote proxy locally representing the server object;
   forwarding the method invocation to a reference layer where a reference object encodes the method invocation into a communication messaging protocol used for communications with the server object, wherein the application and the remote proxy are not aware of the communication messaging protocol the reference layer;
   transmitting the encoded method invocation through the reference layer where a second reference object residing on the server object's computer decodes the method invocation into a format recognizable by the server object;
   forwarding the decoded method invocation to the server object in an object layer; and
   invoking an associated method on the server object.

4. The method of claim 3, further comprising:
   forwarding a result of the method invocation on the server object to the application.

5. A system for communications in a distributed computing environment, comprising:
   an application layer for providing communications between an application and an operating entity;
   a proxy layer for providing communications between the application in the application layer and a remote proxy in the proxy layer, the remote proxy being generated for locally representing a requested object for interactions with the application, the requested object residing in an address space different from an address space of the application;
   a reference layer for providing communications between the remote proxy and the requested object, the reference layer including a reference object having communication protocol details to support transmission of messages across a network linking the remote proxy and the requested object, the reference layer operable to remove the communication protocol details placed into the remote proxy for accessing the requested object and insert into the remote proxy a link to the reference object, wherein the application layer and the proxy layer are not aware of the communication protocol details in the reference layer, wherein the reference layer includes a client-side object request broker executing on a client system and a server-side object request broker executing on a server system and a network connecting the client system to the server system, the client-side object request broker and the server-side object request broker having non-compatible communication messaging protocols;

an object layer including the requested object, the object layer providing a separation of communication messaging protocol details in the reference layer.

6. The system of claim 1, wherein the application resides in the application layer.

7. The system of claim 1, wherein the operating entity interacts with the application in the application layer.

8. The system of claim 1, wherein the proxy layer shields the application layer from a location of the requested object and a communication messaging protocol used to communicate with the requested object.

9. The system of claim 1, wherein the reference layer shields the application layer, the proxy layer, and the object layer from communication messaging protocol details used to send messages between the application and the requested object.

10. The system of claim 1, wherein the requested object resides in the object layer.

11. The system of claim 1, further comprising a reference object residing in the reference layer, the reference object operable to provide the communication messaging protocol details used for communications with the requested object.

12. The system of claim 1, wherein the application layer exists on a client system;

the proxy layer exists on the client system;

the reference layer exists on the client system and a server system; and the object layer exists on the server system.

13. The system of claim 1, wherein the reference layer uses the communications messaging protocol of the server-side object request broker.

14. A method for communications in a distributed computing environment, comprising:

requesting a method invocation for a method of a server object on a server system by an application on a client system, the server system including a server-side object request broker having a different communication messaging protocol than a client-side object request broker on the client system;

generating a remote proxy on the client system to locally represent the server object;

forwarding the method invocation to the remote proxy on the client system;

forwarding the method invocation to a first reference object from the remote proxy, the first reference object residing on the client system;

removing communication messaging protocol details for accessing the server object from the remote proxy;

placing the communication messaging protocol details into the first reference object;

encoding the method invocation into a communication messaging protocol used for communications with the server object, the communication messaging protocol being identified by the first reference object, wherein the application and the remote proxy are not aware of the communication messaging protocol in the first reference object;

transmitting the encoded method invocation across a network;

receiving the encoded method invocation in a second reference object on the server system;

decoding the encoded method invocation into a format recognizable by the server system;

forwarding the decoded method invocation to the server object;

invoking the method on the server object.

15. The method of claim 14, further comprising forwarding a result on the method invocation on the server object to the application.

16. The method of claim 14, further comprising generating a remote proxy for the server object and placing the remote proxy on the client system.

17. The method of claim 14, wherein transmitting the encoded method invocation includes serially sending each byte of the encoded method invocation from the client system to the server system.

18. The method of claim 17, wherein receiving the encoded method invocation includes reconstituting the encoded method invocation from the serially received bytes.

* * * * *